US011644847B2

(12) United States Patent
Miller et al.

(10) Patent No.: US 11,644,847 B2
(45) Date of Patent: May 9, 2023

(54) METHOD AND SYSTEM FOR REARRANGING ASSETS FOR MOBILE ROBOTS

(71) Applicant: Ford Global Technologies, LLC, Dearborn, MI (US)

(72) Inventors: Justin Miller, Berkley, MI (US); Mario Anthony Santillo, Canton, MI (US); Raj Sohmshetty, Canton, MI (US); Meghna Menon, Rochester Hills, MI (US); Matthew Cui, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 17/063,284

(22) Filed: Oct. 5, 2020

(65) Prior Publication Data
US 2022/0107654 A1 Apr. 7, 2022

(51) Int. Cl.
*G05D 1/02* (2020.01)
*G05D 1/00* (2006.01)
*G01C 21/20* (2006.01)

(52) U.S. Cl.
CPC ......... *G05D 1/0287* (2013.01); *G05D 1/0088* (2013.01); *G05D 1/0214* (2013.01); *G01C 21/206* (2013.01)

(58) Field of Classification Search
CPC .. G05D 1/0287; G05D 1/0088; G05D 1/0214; G05D 1/0297; G05D 2201/0216; G05D 1/0217; G05D 2201/0217; G01C 21/206; Y02P 90/02
See application file for complete search history.

(56) References Cited

U.S. PATENT DOCUMENTS

| | | | |
|---|---|---|---|
| 7,904,191 B2 | 3/2011 | Rossi et al. | |
| 9,087,314 B2* | 7/2015 | Hoffman | G05D 1/0274 |
| 10,022,867 B2* | 7/2018 | Saboo | B25J 9/1661 |
| 10,133,276 B1* | 11/2018 | Shydo, Jr. | G05D 1/0223 |
| 10,210,212 B2 | 2/2019 | Wang et al. | |
| 2018/0036882 A1 | 2/2018 | Kimura | |
| 2019/0193724 A1* | 6/2019 | Kim | G08G 1/143 |
| 2020/0327768 A1* | 10/2020 | Rossano | E01F 13/00 |

FOREIGN PATENT DOCUMENTS

| | | |
|---|---|---|
| WO | 2019154445 | 5/2019 |
| WO | 2020061258 | 3/2020 |

* cited by examiner

*Primary Examiner* — Jaime Figueroa
*Assistant Examiner* — Blake A Wood
(74) *Attorney, Agent, or Firm* — Burris Law, PLLC

(57) ABSTRACT

A method for navigating a robot within an environment based on a planned route includes providing the planned route to the robot, where the planned route is based on a destination of the robot and an origin of the robot. The method includes determining whether an object obstructs the robot as the robot travels along the planned route, where the environment includes the object. The method includes moving the object from the planned route in response to the robot obstructing the object.

16 Claims, 8 Drawing Sheets

METHOD AND SYSTEM FOR REARRANGING ASSETS FOR MOBILE ROBOTS

FIELD

The present disclosure relates to methods and systems for rearranging assets for mobile robots.

BACKGROUND

The statements in this section merely provide background information related to the present disclosure and may not constitute prior art.

A manufacturing environment can include one or more mobile robots that perform various automated tasks, such as moving materials and tools within the manufacturing environment. The mobile robots may autonomously travel to various locations within the manufacturing environment to perform the various automated tasks. However, the complex layout of the manufacturing environment resulting from one or more obstacles therein may cause the robot to travel around the obstacles as it travels to a given destination, thereby inhibiting the efficiency of the automated tasks it performs.

These issues with the use of mobile robots in a manufacturing environment, among other issues with mobile robots, are addressed by the present disclosure.

SUMMARY

This section provides a general summary of the disclosure and is not a comprehensive disclosure of its full scope or all of its features.

The present disclosure provides a method or navigating a robot within an environment based on a planned route includes providing the planned route to the robot, where the planned route is based on a destination of the robot and an origin of the robot. The method includes determining whether an object obstructs the robot as the robot travels along the planned route, where the environment includes the object. The method includes moving the object from the planned route in response to the robot obstructing the object.

In some forms, the object includes a movement system for moving the object to various positions within the environment, and moving the object further includes instructing the object to autonomously move to a position from among the various positions.

In some forms, moving the object further includes instructing a second robot to move the object.

In some forms, the method further includes determining whether the object is available to be moved based on at least one of state data associated with the object and sensor data obtained from one or more infrastructure sensors. The method further includes moving the object when the robot is proximate the object in response to a determination that the object is available to be moved.

In some forms, the method further includes defining an alternative route based on the destination and a location of the object in response to a determination that the object is not available to be moved.

In some forms, the state data indicates whether a second robot is requesting to move the object, whether the object is moveable, or a combination thereof. In some forms, the sensor data corresponds to an area surrounding the object and indicates whether the object can be moved based on one or more additional objects in the area surrounding the object.

In some forms, the sensor data is image data obtained from the infrastructure sensors.

The present disclosure also provides a method for navigating a robot within an environment based on a planned route, where the planned route is based on a destination of the robot and an origin of the robot. The method includes providing the planned route to the robot, where the planned route is based on a destination of the robot and an origin of the robot. The method includes determining whether an object obstructs the robot as the robot travels along the planned route, where the environment includes the object. The method includes determining whether the object is available to be moved and moving the object in response to the object obstructing the robot and in response to the object being available to be moved.

In some forms, the object includes a movement system for moving the object to various positions within the environment, and where moving the object further comprises instructing the object to autonomously move to a position from among the various positions.

In some forms, moving the object further includes instructing a second robot to move the object.

In some forms, where determining whether the object is available to be moved is further based on at least one of state data associated with the object and sensor data obtained from one or more infrastructure sensors.

In some forms, the state data indicates whether a second robot is requesting to move the object, whether the object is moveable, or a combination thereof. The sensor data corresponds to an area surrounding the object and indicates whether the object can be moved based on one or more additional objects in the area surrounding the object.

In some forms, the sensor data is image data obtained from the infrastructure sensors.

In some forms, the state data indicates a hierarchal relationship between the robot and the second robot.

In some forms, determining whether the object is available to be moved further includes determining whether the hierarchal relationship indicates the second robot has a movement priority over the robot. The method includes, in response to the hierarchal relationship indicating that the second robot has the movement priority over the robot, determining whether the second robot has completed a request to move the object.

In some forms, the method further includes moving the object to an original position in response to the second robot completing the request to move the object.

In some forms, the method further includes defining an alternative route based on the destination and a location of the object in response to a determination that the object is not available to be moved.

The present disclosure also provides a system for navigating a robot within an environment based on a planned route. The system includes a processor communicably coupled to the robot and a nontransitory computer-readable medium including instructions that are executable by the processor. The instructions include providing a destination for the robot within the environment and providing the planned route to the robot, where the planned route is based on the destination of the robot and an origin of the robot. The instructions include determining whether the object obstructs the robot as the robot travels along the planned route, where the environment includes the object. The instructions include moving the object in response to the object obstructing the robot.

In some forms, the instructions for moving the object further includes at least one of instructing the object to autonomously move to a position from among the various positions and instructing a second robot to move the object.

In some forms, the instructions further include determining whether the object is available to be moved based on at least one of state associated with the object and sensor data obtained from one or more infrastructure sensors and moving the object when the robot is proximate the object in response to a determination that the object is available to be moved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
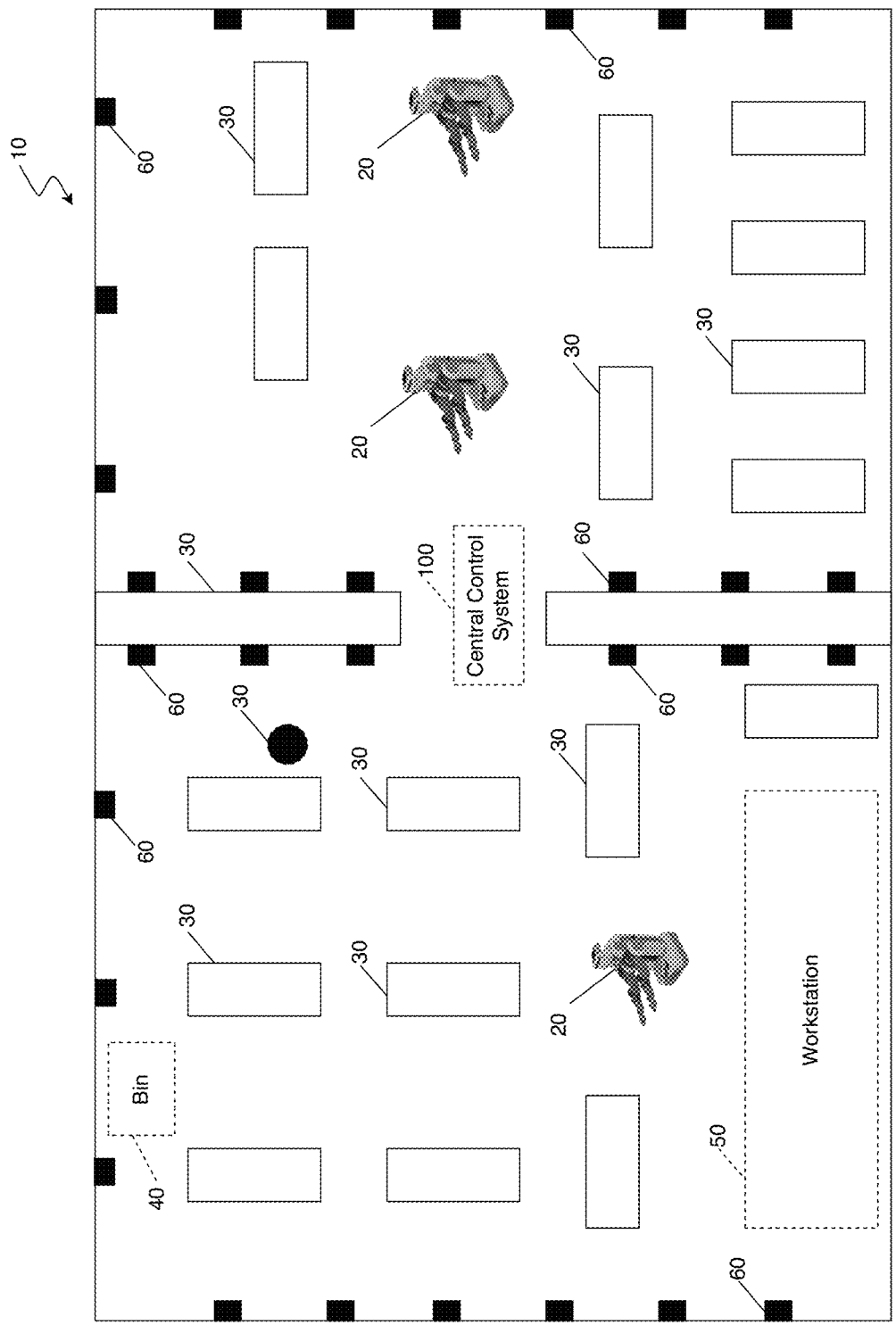
FIG. 1A illustrates a manufacturing environment having a robot and a central control system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides for a control system for one or more robots within a manufacturing environment. The control system plans a route for a robot within the manufacturing environment based on a given destination and a current position of the robot (i.e., the origin of the robot). As the robot travels along the planned route, the control system determines whether an object within the manufacturing environment obstructs the robot. If the object obstructs the robot, the control system generates a command to move the object and thereby, reduces the distance traveled by the robot and the required time to arrive at the destination. As such, the efficiency of various manufacturing processes that utilize the robot improves.

Figure 1B:
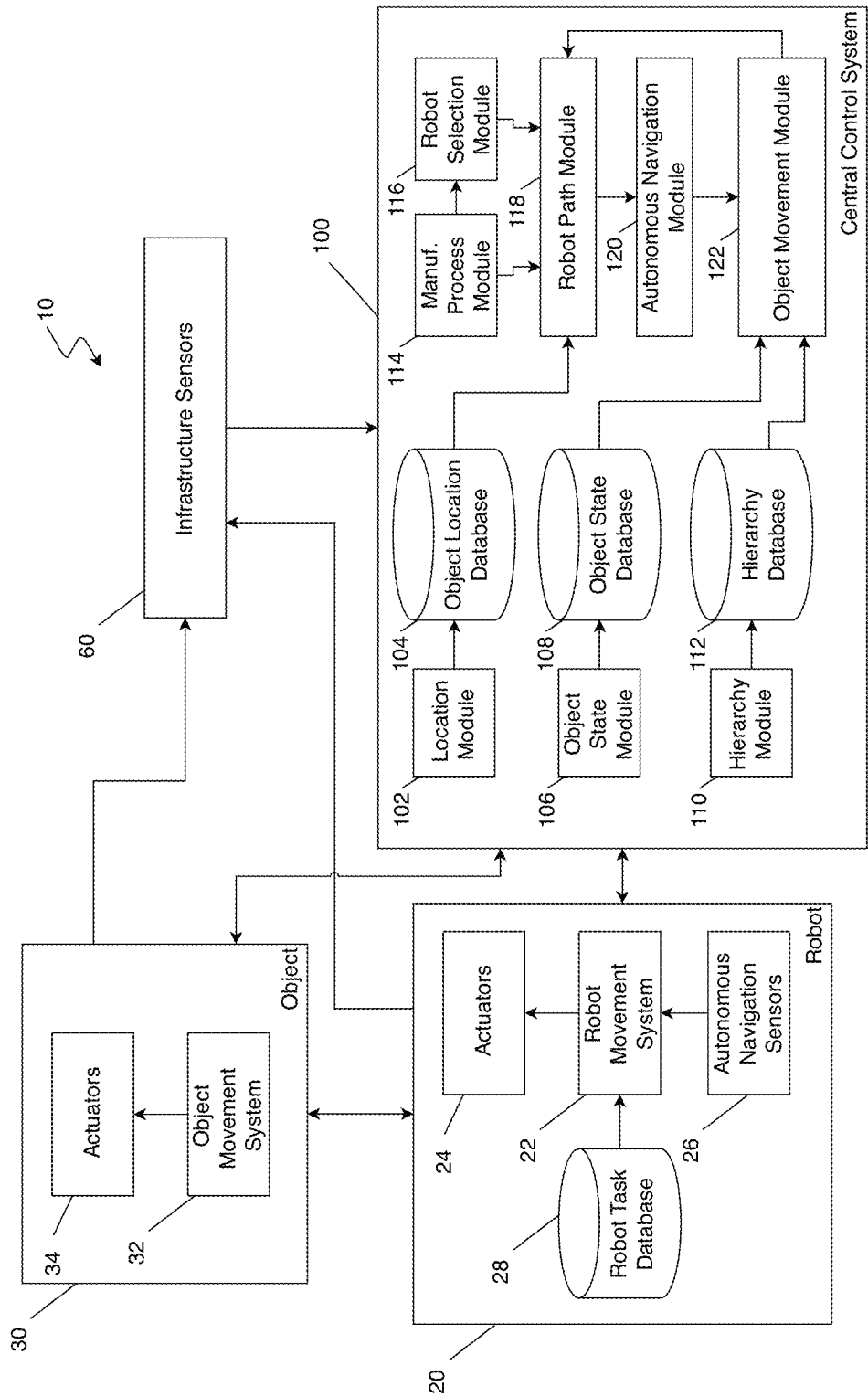
FIG. 1B is a functional block diagram of the robot and the central control system in accordance with the teachings of the present disclosure.

Referring to FIGS. 1A-1B, a manufacturing environment 10 for manufacturing a component (e.g., a vehicle) is provided. The manufacturing environment 10 generally includes robots 20, a plurality of objects 30, a bin 40, a workstation 50, infrastructure sensors 60, and a central control system 100. While the central control system 100 is illustrated as part of the manufacturing environment 10, it should be understood that the central control system 100 may be positioned remotely from the manufacturing environment 10 in other forms. In one form, the robots 20, the objects 30, the infrastructure sensors 60, and/or the central control system 100 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the robots 20 are mobile robots that are partially or fully-autonomous and are configured to autonomously move to various locations of the environment 10, as instructed by the central control system 100. To autonomously move itself and as shown in FIG. 1B, the robots 20 each include a robot movement system 22 to control various movement systems of the robot 20 (e.g., propulsion systems, steering systems, and/or brake systems) via actuators 24 and based on one or more autonomous navigation sensors 26 (e.g., a global navigation satellite system (GNSS) sensor, an imaging sensor, a local position sensor, among others). Furthermore, the robot movement systems 22 are configured to operate the actuators 24 to control the motion of one or more robotic links (e.g., robotic arms) attached thereto and thereby perform one or more automated tasks defined in a robot task database 28. The one or more automated tasks may refer to one or more motions the robot 20 performs to achieve a desired result (e.g., removing a part from the bin 40).

To perform the functionality described herein, the robot movement systems 22 may include one or more processor circuits that are configured to execute machine-readable instructions stored in one or more nontransitory computer-readable mediums, such as a random-access memory (RAM) circuit and/or read-only memory (ROM) circuit. The robot movement systems 22 may also include other components for performing the operations described herein such as, but not limited to, movement drivers and systems, transceivers, routers, and/or input/output interface hardware.

While the manufacturing environment 10 shown in FIGS. 1A-1B illustrates robots 20, it should be understood that the manufacturing environment 10 can include various other unmanned vehicles in addition to or in place of the robots 20 in other forms. As an example, the manufacturing environment 10 can include drones, automated guided vehicles, among others, that are similarly configured as the robots 20 (e.g., the drones include a movement system to control autonomous movement throughout the manufacturing environment 10).

In one form, at least some of the objects 30 are moveable and include an object movement system 32 configured to control the movement of the object 30 between various positions within the manufacturing environment 10. As an example, the object movement system 32 may control one or more actuators 34 to autonomously move the object 30 in response to a command from the central control system 100 and/or a command from the robot 20 to move the object 30, as described below in further detail. Furthermore, the object movement system 32 is configured to broadcast state data to the central control system 100 indicating whether the object 30 is available to be moved. As an example, the state data may indicate whether the object 30 is moveable, whether a robot 20 is requesting to move the object 30, among others. To perform the functionality described herein, the object movement system 32 may include one or more processor circuits that are configured to execute machine-readable instructions stored in one or more nontransitory computer-readable mediums, such as a RAM circuit and/or ROM circuit. The object movement system 32 may also include other components for performing the operations described herein, such as, but not limited to, movement drivers and systems, transceivers, routers, and/or input/output interface hardware.

In one form, the infrastructure sensors 60 are imaging sensors that obtain imaging data of the manufacturing environment 10 and detect the robots 20 and the objects 30 within the manufacturing environment 10. The infrastructure sensors 60 may include a two-dimensional camera, a three-dimensional camera, an infrared sensor, a radar scanner, a laser scanner, a light detection and ranging (LIDAR) sensor, an ultrasonic sensor, among others. In one form, the infrastructure sensors 60 are disposed on an infrastructure element within the manufacturing environment 10, such as, but not limited to, a tower, a light pole, a building, a sign, drones, additional robots, automated guided vehicles, among other fixed and/or moveable elements of the manufacturing environment 10.

In one form, the central control system 100 includes a location module 102, an object location database 104, an object state module 106, an object state database 108, a hierarchy module 110, and a hierarchy database 112. Furthermore, the central control system 100 includes, a manufacturing process module 114, a robot selection module 116, a robot path module 118, an autonomous navigation module 120, and an object movement module 122. It should be readily understood that any one of the components of the central control system 100 can be provided at the same location or distributed at different locations and communicably coupled accordingly. To perform the functionality as described herein, the central control system 100 includes one or more processor circuits that are configured to execute machine-readable instructions stored in one or more non-transitory computer-readable mediums, such as a RAM circuit and/or ROM circuit. It should be readily understood that the central control system 100 may include other components for performing the operations described herein such as, but not limited to, communication transceivers, routers, input/output communication interfaces, databases, among others.

In one form, the location module 102 is configured to obtain the image data from the infrastructure sensors 60, detect the objects 30 and the robots 20 based on the image data, and determine the location of the objects 30 and the robots 20 based on the image data. As an example, the location module 102 employs known digital image recognition techniques to process the image data and locate the objects 30 and the robots 20 captured by the infrastructure sensors 60. The location module 102 then determines the location of the identified objects 30 and the identified robots 20 based on the image data and a digital map representing the manufacturing environment 10, and the location module 102 stores the determined locations in the object location database 104. In some forms, the location module 102 may also provide additional characteristics of the object 30 and/or robots 20, such an object type, travel direction/speed if the object 30 and/or robot 20 is moving, among others.

While the location module 102 is provided as determining the location of the robots 20 based on the image data from the infrastructure sensors 60, the location module 102 may determine the location of the robots 20 based on based on sensor data from the one or more autonomous navigation sensors 26 of the robot 20 (e.g., location data from a GNSS sensor of the robot 20).

Furthermore, the location module 102 is configured to detect obstructions within an area surrounding the detected objects 30. The location module 102 is configured to detect obstructions both statically and as both the robots 20 and objects 30 autonomously move within the manufacturing environment 10, as described below in further detail. As an example, the location module 102 employs known digital image recognition techniques to process the image data and locate the obstructions captured by the infrastructure sensors 60. In some forms, the obstructions in the surrounding area include, but are not limited to, an additional object 30, robot 20, and/or operator, among others.

In one form, the object state module 106 is configured to obtain state data from the objects 30 and store said state data in the object state database 108. As an example, the object state module 106 receives state data from the object movement systems 32 of the objects 30, where the state data indicates whether the object 30 is moveable, whether the object 30 is available to be moved, whether one of the robots 20 is requesting to move the object 30, among others.

In one form, the hierarchy module 110 is configured to determine a hierarchal relationship among the robots 20 and store said hierarchal relationship in the hierarchy database 112. More specifically, the hierarchy module 110 defines movement priorities of each of the robots 20. In one form, the movement priorities may be predefined. In another form, the movement priorities may be dynamically updated based on a current task performed by the robots 20. As described below in further detail, the object movement module 122 may selectively instruct one of the objects 30 to autonomously move based on the movement priorities associated with the robots 20.

In one form, the manufacturing process module 114 is configured to define a manufacturing process and associated task to be performed by one of the robots 20 within the manufacturing environment 10. As an example, a list of manufacturing processes/tasks may be predefined and stored in a database, and a manufacturing process/task may be selected based on a status of one or more of manufacturing processes of the list (e.g., if a production process is completed, the manufacturing process module 114 may define an inspection process as the manufacturing process to be performed by the robots 20). Furthermore, the manufacturing process module 114 may also select a destination associated with the manufacturing process/task. Accordingly, the robot selection module 116 may select a robot from among the robots 20 to perform the associated task based on the destination, a configuration of the robot 20, and/or availability of the robot 20.

In one form, the robot path module 118 is configured to define a planned path for the robots 20 based on the location of the selected robot 20, a given destination associated with the manufacturing process, and/or the task to be performed by the robot 20. As an example, the manufacturing process corresponds to the robot 20 traveling to the bin 40, and thus, the planned route is provided between the current location of the robot 20 to the destination, which is the bin 40. In one form, the robot path module 118 is configured to determine the planned route as the shortest travel path for the robot 20 to the bin 40. In some forms, the robot path module 118 may define the planned path for the robots 20 based on a digital map of the manufacturing environment 10, where the digital map identifies the location of one or more of the objects 30 that are defined as immoveable.

In one form, the autonomous navigation module 120 is configured to instruct the robots 20 to autonomously navigate within the manufacturing environment 10 based on the planned route. As an example, the autonomous navigation module 120 instructs the robots 20 to autonomously navigate by transmitting the planned path to the robot movement system 22 and instructing the robot to travel to the destination based on the planned path. As another example, the autonomous navigation module 120 remotely and autonomously controls the robots 20 as they travel to their respective destinations. To control the autonomous movement of the robot 20, the autonomous navigation module 120 and/or the robot 20 may employ known autonomous navigation routines, such as a path planning routine, a maneuver planning routine, and/or a trajectory planning routine.

As the robot 20 autonomously travels along the planned route, the object movement module 122 is configured to determine whether any one of the objects 30 obstructs the robot 20 and whether the object 30 is available to be moved based on the state data associated with the object. If the object 30 obstructs the robot 20 and is available to be moved because, for example, the state data indicates that the requesting robot 20 has a higher movement priority than another requesting robot 20, the object 30 is moveable, and/or the location module 102 determines that no obstructions are located in an area surrounding the object 30, the object movement module 122 instructs the object 30 to autonomously move to a designated position so that it does not obstruct the robot 20. Alternatively, if the object 30 obstructs the robot 20 and is not available to be moved because, for example, the state data indicates another robot 20 with a higher movement priority is requesting a move, the object 30 is immoveable, and/or the location module 102 determines that an obstruction is located in an area surrounding the object 30, the object movement module 122 commands the robot path module 118 to define an alternative route for the robot 20 to avoid the object 30.

Figure 2A:
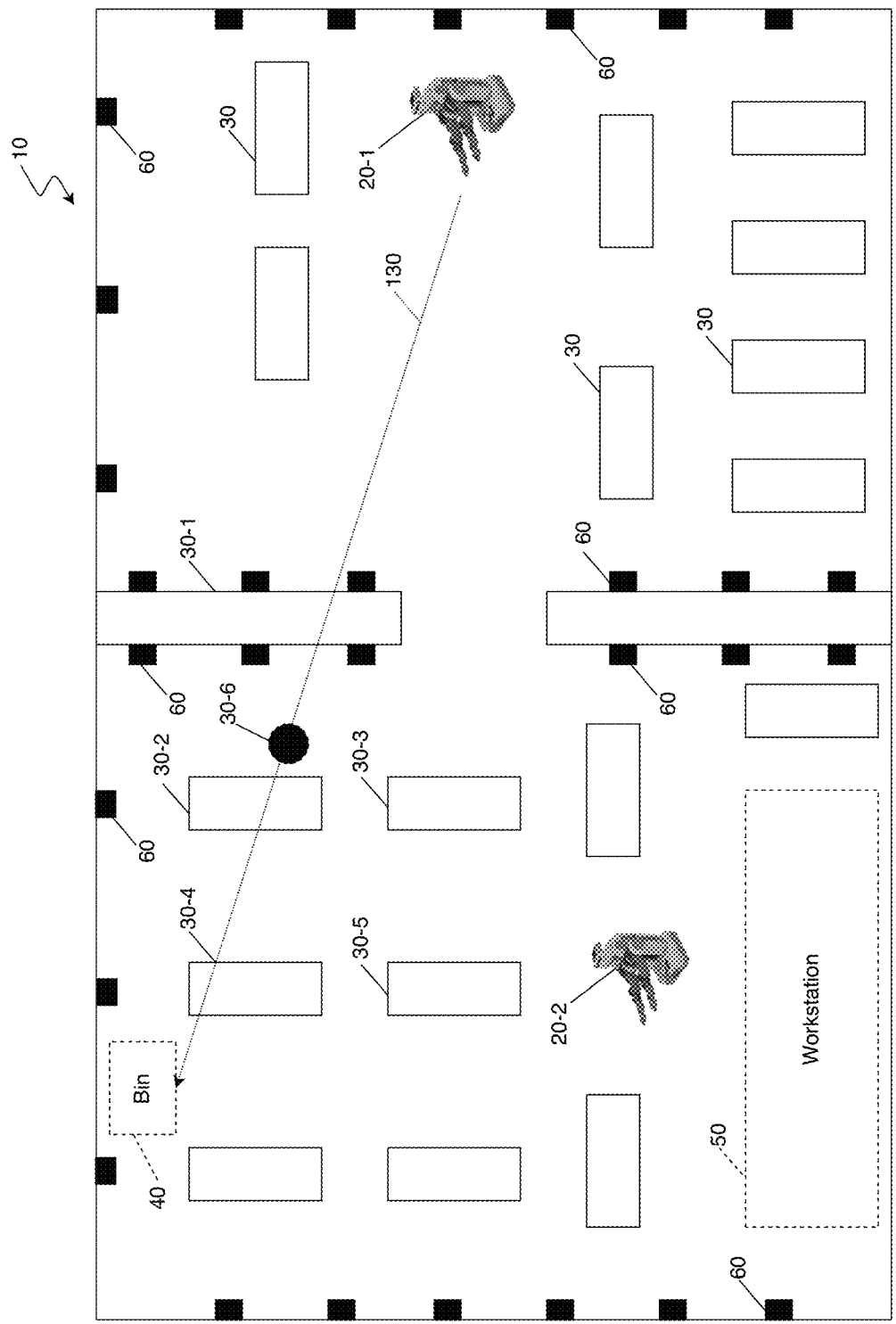
FIG. 2A illustrates a planned route for the robot based on an origin and a destination within the manufacturing environment in accordance with the teachings of the present disclosure.
Figure 2B:
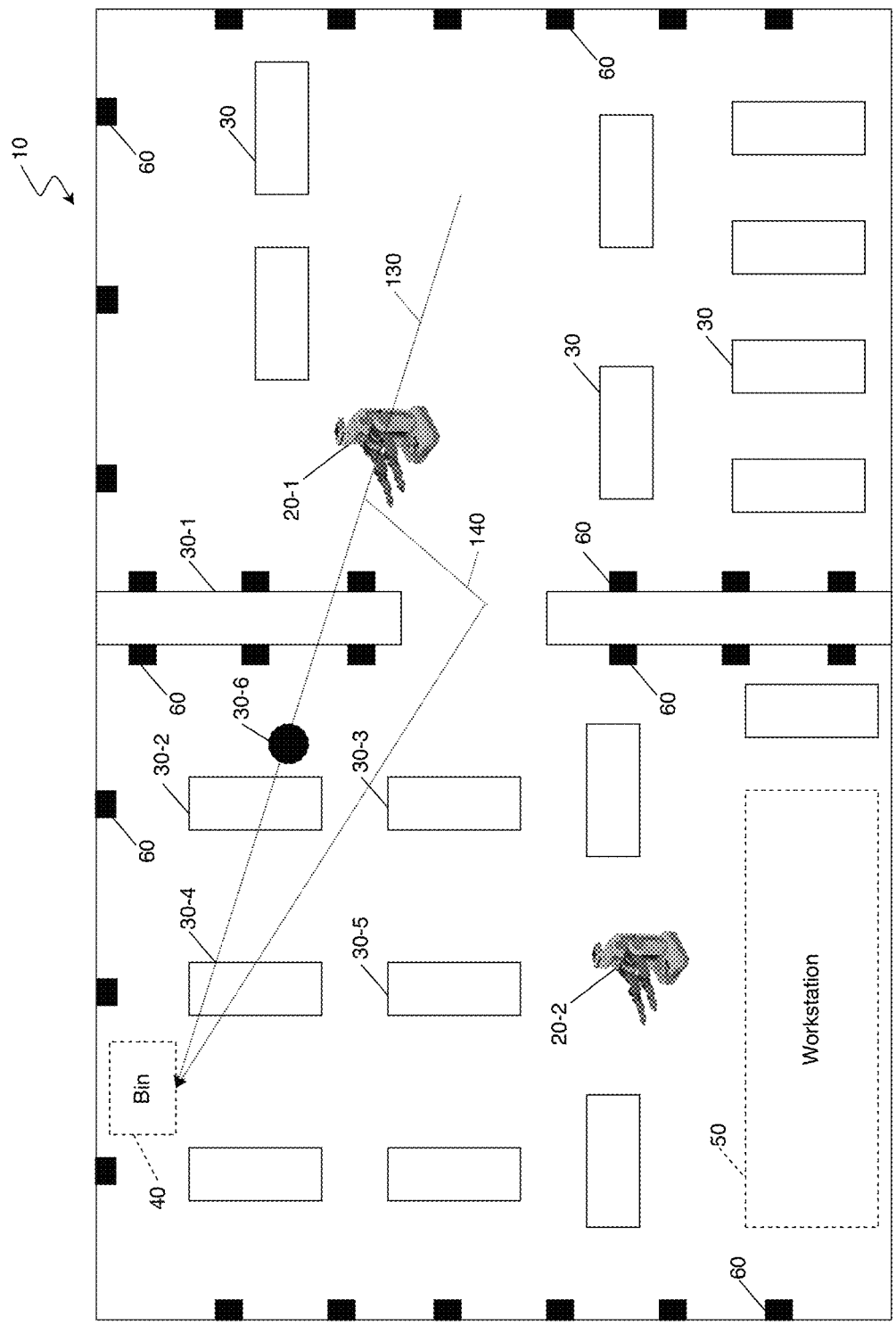
FIG. 2B illustrates the robot interacting with a first object as it travels along a planned route in accordance with the teachings of the present disclosure.

In the exemplary application provided by the manufacturing environment 10 and as shown in FIGS. 2A-2D, robot 20-1 may autonomously navigate to the bin 40 to retrieve parts in accordance with a given manufacturing process. As shown in FIG. 2A, the robot path module 118 may generate a planned route 130 based on the displacement between the origin of robot 20-1 and the bin 40 (i.e., the destination). As shown in FIG. 2B, when the robot 20-1 autonomously travels proximate to (i.e., adjacent and/or near) a first object 30-1 (e.g., a wall), the object movement module 122 determines whether the first object 30-1 can be moved based on state data associated with the first object 30-1 and sensor data from the infrastructure sensors 60. In this example, the object movement module 122 determines that the object 30-1 is immoveable based on the state data and, as such, commands the robot path module 118 to define an alternative route 140 for the robot 20-1.

Figure 2C:
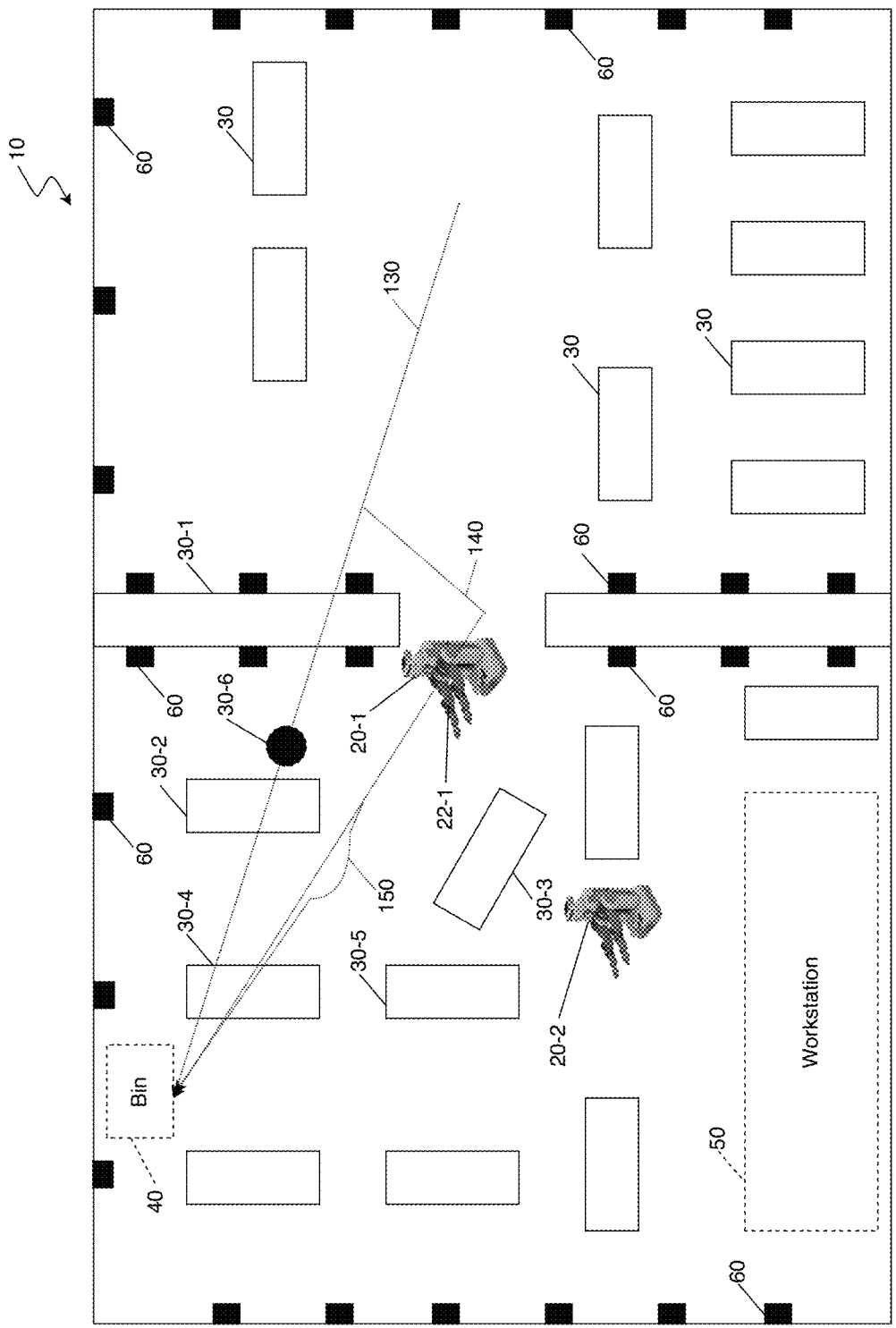
FIG. 2C illustrates the robot interacting with a second object as it travels along a planned route in accordance with the teachings of the present disclosure.
Figure 2D:
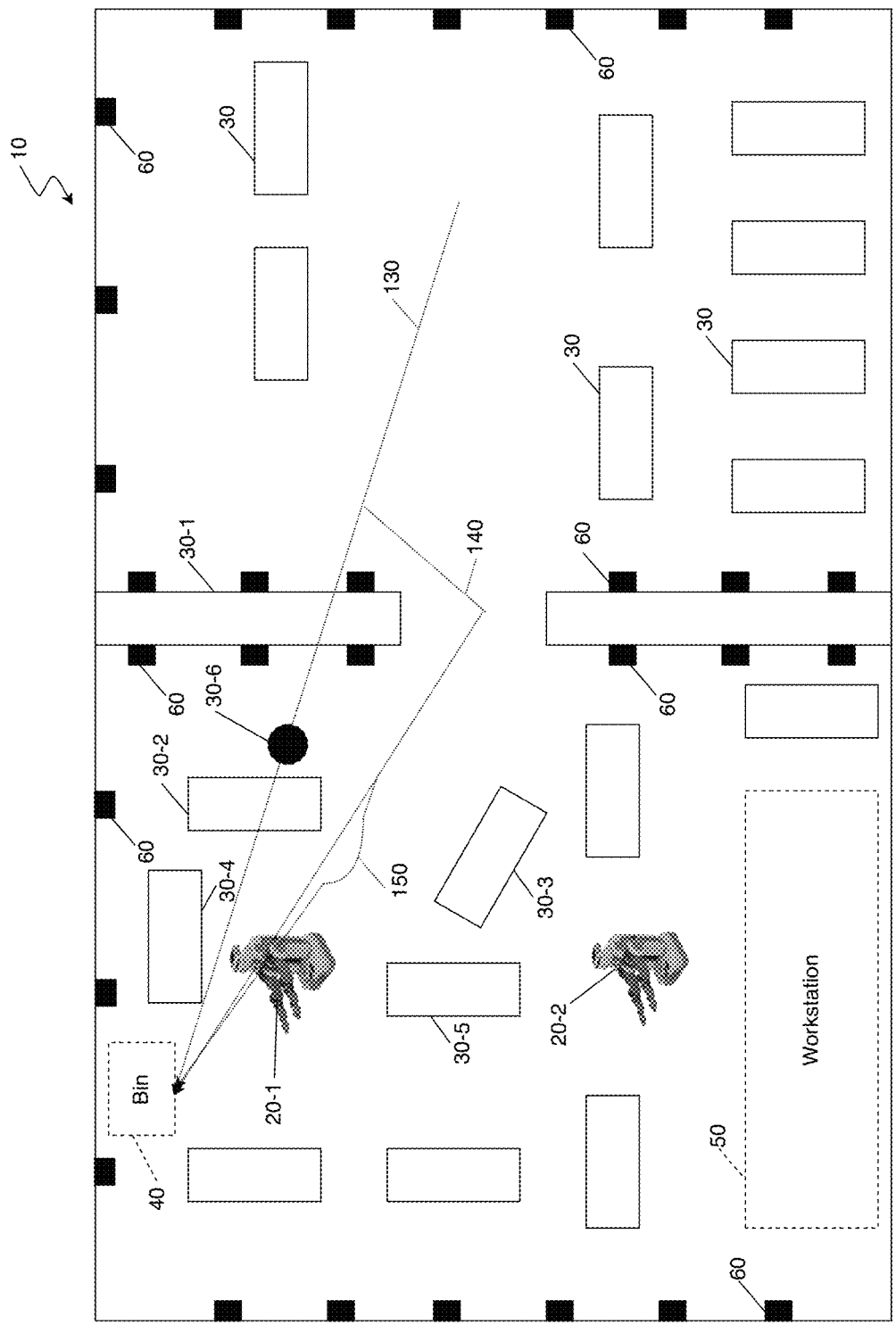
FIG. 2D illustrates the robot interacting with a third object as it travels along a planned route in accordance with the teachings of the present disclosure.

As the robot travels along alternative route 140, the robot 20-1 approaches object 30-3 (e.g., mobile bins), as shown in FIG. 2C. Based on the state data associated with object 30-3, the object movement module 122 determines robot 20-2 is requesting to move object 30-3, but the robot 20-1 has a higher movement priority than robot 20-2. Accordingly, the object movement module 122 issues a command to move object 30-2 to enable the robot 20-1 to proceed along alternative route 140. In one form, the object movement module 122 instructs the object movement system 32 (not shown) of the object 30-3 to autonomously move to a position within the manufacturing environment 10 such that the object 30-3 does not obstruct the robot 20-1 as it travels along alternative route 140. In another form, the object movement module 122 instructs an available robot 20 (e.g., robot 20-2) to initially move the object 30-3 to a position within the manufacturing environment 10 such that the object 30-3 does not obstruct the robot 20-1 as it travels along alternative route 140. Subsequently, the object movement module 122 instructs the robot 20-2 to return the object 30-3 to its original position or a predefined position.

As the robot 20-1 continues traveling along alternative route 140, the robot 20-1 subsequently approaches an area proximate to the object 30-2, as shown in FIG. 2C. Based on the state data associated with object 30-2, the object movement module 122 determines that object 30-2 is moveable and that robot 20-2 is not requesting to move the object 30-2. However, the object movement module 122 determines that object 30-2 cannot be moved as a result of an obstruction detected by the location module 102. More particularly, the location module 102 determines that object 30-6 is in a surrounding area of object 30-2 and obstructs the movement of object 30-2. As such, the object movement module 122 commands the robot path module 118 to define another alternative route 150 to avoid object 30-2.

As the robot 20-1 travels along alternative route 150 to the bin 40, the robot 20-1 approaches object 30-5. Based on the state data associated with object 30-5, the object movement module 122 determines robot 20-2 is not requesting to move object 30-5, object 30-5 is moveable, and that no obstructions are present in an area surrounding the object 30-5. Accordingly the object movement module 122 issues a command to the object movement system 32 of the object 30-5 to autonomously move to a location within the manufacturing environment 10 such that it does not obstruct the robot 20-1 as it travels along alternative route 150.

As such, and as shown in FIGS. 2A-2D, the central control system 100 dynamically defines a route for the robot 20-1 that minimizes the distance it travels and the required time to arrive at the bin 40. More particularly, the robot path module 118 initially provides the planned route 130 for the robot 20-1 and dynamically updates the route of the robot (i.e., alternative routes 140, 150) based on the state data associated with the objects 30 and the sensor data from the infrastructure sensors 60.

Figure 3:
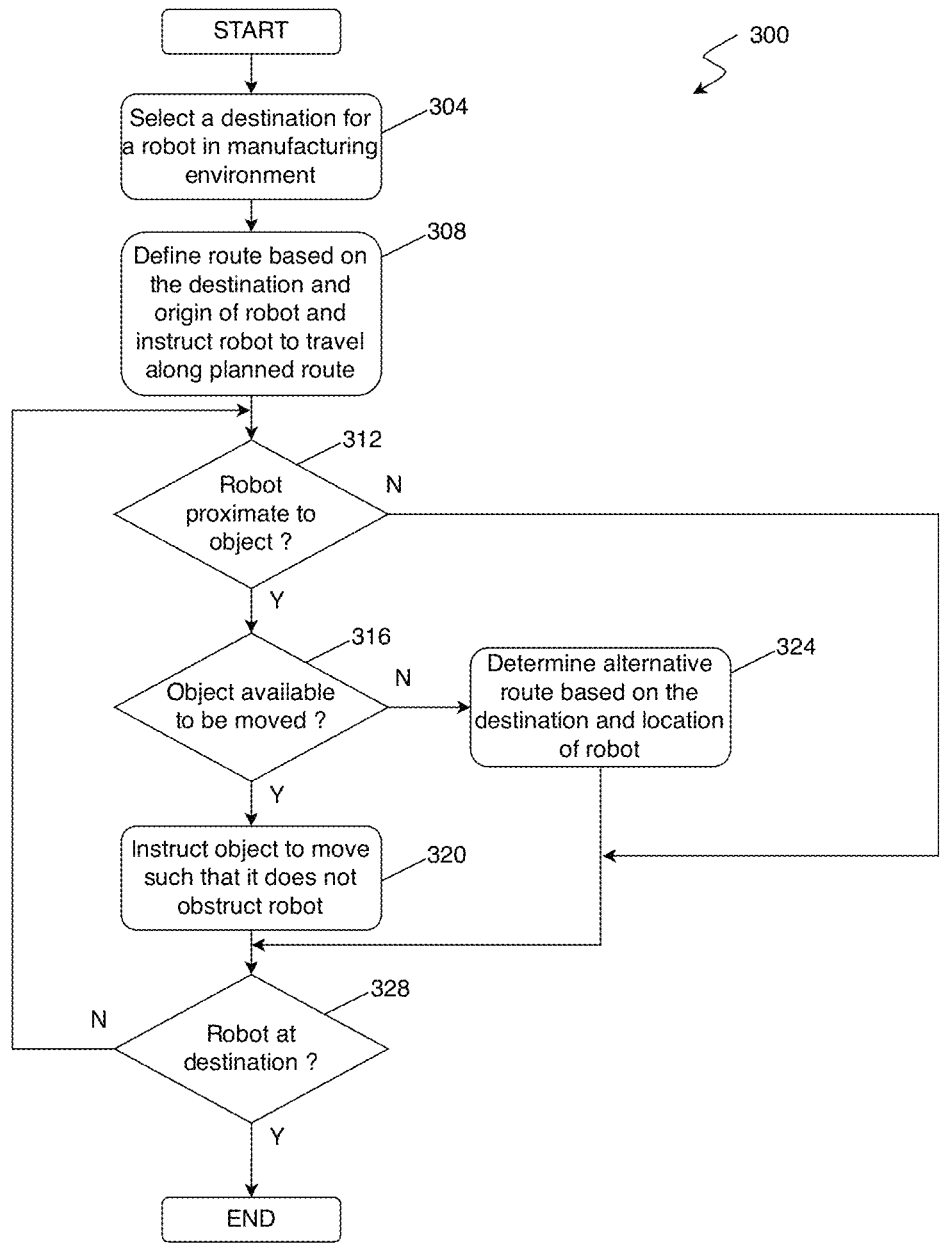
FIG. 3 illustrates an example control routine in accordance with the teachings of the present disclosure.

Referring to FIG. 3, a routine 300 for moving objects 30 within the manufacturing environment 10 as the robot 20 autonomously navigates is shown and performed by the central control system 100. At 304, the central control system 100 selects a destination for the robot 20 in the manufacturing environment 10. At 308, the central control system 100 defines a planned route based on the destination and the origin of the robot 20 and instructs the robot 20 to travel along the planned route. At 312, the central control system 100 determines whether the robot 20 is proximate to one of the objects 30 as it travels along the planned route. If so, the routine 300 proceeds to 316. Otherwise, if the robot 20 is not proximate to one of the objects 30 as it travels along the planned route, the routine 300 proceeds to 328. At 316, the central control system 100 determines whether the object 30 is available to be moved based on the state data. If so, the routine 300 proceeds to 320, where the central control system 100 instructs the object 30 to move such that it does not obstruct the robot 20. Otherwise, if the central control system 100 determines that the object 30 is unavailable to be moved, the routine 300 proceeds to 324, where the central control system 100 defines an alternative route based on the location of the robot 20 and the destination and then proceeds to 328. At 328, the central control system 100 determines whether the robot 20 has reached the destination. If the robot 20 has not reached the destination, the routine 300 proceeds to 312. Otherwise, if the robot 20 has reached the destination, the routine 300 ends.

Figure 4:
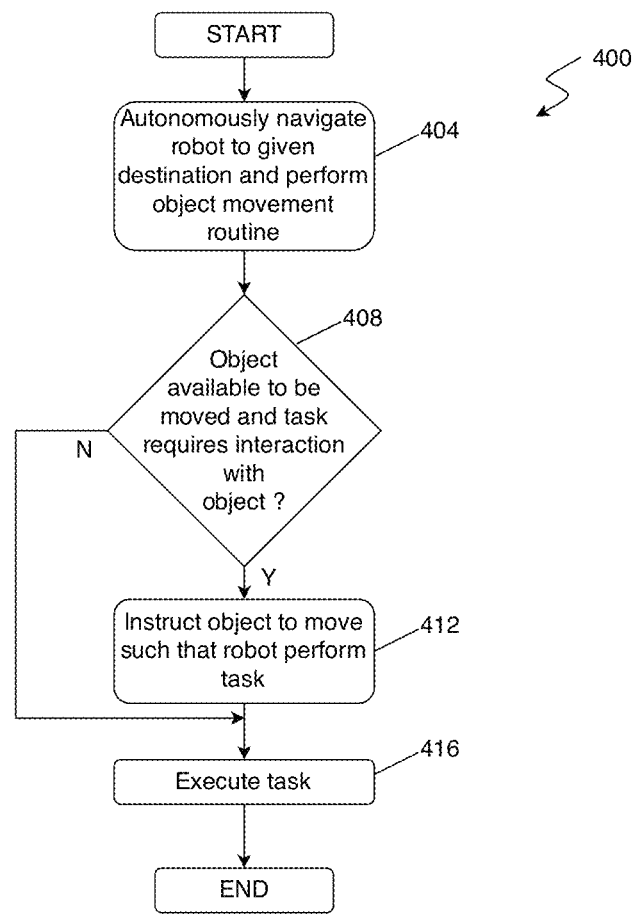
FIG. 4 illustrates another example control routine in accordance with the teachings of the present disclosure.

Referring to FIG. 4, another routine 400 for moving objects 30 within the manufacturing environment 10 as the robot 20 autonomously navigates is shown. At 404, the central control system 100 the central control system 100 performs the object movement routine (e.g., routine 300 described above with reference to FIG. 3) as the robot 20 autonomously navigates to a given destination. At 408, the central control system 100 determines whether an object 30 is available to be moved and the task requires the robot 20 to interact with the object 30. If so, the routine 400 proceeds to 412, where the central control system 100 instructs the object 30 to move such that it enables the robot 20 to more efficiently perform the task associated with the manufacturing process, and the routine 400 then proceeds to 416. Otherwise, if the object 30 is unavailable to be moved, the routine 400 proceeds to 416, where the robot 20 performs the task associated with the manufacturing process.

It should be readily understood that the routines 300 and 400 are just example implementations of the central control system 100 and other control routines may be implemented.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method for navigating a robot within an environment based on a planned route, the method comprising:
providing the planned route to the robot, wherein the planned route is based on a destination of the robot and an origin of the robot;
determining whether an object obstructs the robot as the robot travels along the planned route, wherein the environment includes the object;
determining whether the object is available to be moved based on at least one of state data associated with the object and sensor data obtained from one or more infrastructure sensors, wherein the state data indicates a movement priority associated with the robot and a second robot and whether the second robot is requesting to move the object; and
moving the object from the planned route in response to the object obstructing the robot and in response to a determination that the object is available to be moved.

2. The method of claim 1, wherein the object includes a movement system for moving the object to various positions within the environment, and wherein moving the object further comprises instructing the object to autonomously move to a position from among the various positions.

3. The method of claim 1, wherein moving the object further comprises instructing a second robot to move the object.

4. The method of claim 1 further comprising defining an alternative route based on the destination and a location of the object in response to a determination that the object is not available to be moved.

5. The method of claim 1, wherein:
the state data indicates whether a second robot is requesting to move the object, whether the object is moveable, or a combination thereof; and
the sensor data corresponds to an area surrounding the object and indicates whether the object can be moved based on one or more additional objects in the area surrounding the object.

6. The method of claim 5, wherein the sensor data is image data obtained from the infrastructure sensors.

7. A method for navigating a robot within an environment based on a planned route, the method comprising:
  providing the planned route to the robot, wherein the planned route is based on a destination of the robot and an origin of the robot;
  determining whether an object obstructs the robot as the robot travels along the planned route, wherein the environment includes the object;
  determining whether the object is available to be moved based on at least one of state data associated with the object and sensor data obtained from one or more infrastructure sensors, wherein the state data indicates a movement priority associated with the robot and a second robot and whether the second robot is requesting to move the object; and
  moving the object from the planned route in response to the object obstructing the robot and in response to the object being available to be moved.

8. The method of claim 7, wherein the object includes a movement system for moving the object to various positions within the environment, and wherein moving the object further comprises instructing the object to autonomously move to a position from among the various positions.

9. The method of claim 7, wherein moving the object further comprises instructing a second robot to move the object.

10. The method of claim 7, wherein:
  the state data indicates whether a second robot is requesting to move the object, whether the object is moveable, or a combination thereof; and
  the sensor data corresponds to an area surrounding the object and indicates whether the object can be moved based on one or more additional objects in the area surrounding the object.

11. The method of claim 10, wherein the sensor data is image data obtained from the infrastructure sensors.

12. The method of claim 7, wherein determining whether the object is available to be moved further comprises:
  determining whether the second robot has a higher movement priority than a movement priority of the robot; and
  in response to the hierarchal relationship indicating that the second robot has the higher movement priority than the movement priority of the robot, determining whether the second robot has completed a request to move the object.

13. The method of claim 12, further comprising moving the object to an original position in response to the second robot completing the request to move the object.

14. The method of claim 7 further comprising defining an alternative route based on the destination and a location of the object in response to a determination that the object is not available to be moved.

15. A system for navigating a robot within an environment based on a planned route, the system comprising:
  a processor communicably coupled to the robot; and
  a nontransitory computer-readable medium including instructions that are executable by the processor, wherein the instructions include:
    providing a destination for the robot within the environment;
    providing the planned route to the robot, wherein the planned route is based on the destination of the robot and an origin of the robot;
    determining whether an object obstructs the robot as the robot travels along the planned route based on at least one of state data associated with the object and sensor data obtained from one or more infrastructure sensors, wherein the state data indicates a movement priority associated with the robot and a second robot and whether the second robot is requesting to move the object, wherein the environment includes the object; and
    moving the object from the planned route in response to the object obstructing the robot and in response to a determination that the object is available to be moved.

16. The system of claim 15, wherein the instructions for moving the object further comprises at least one of instructing the object to autonomously move to a position from among various positions and instructing a second robot to move the object.

* * * * *